Patented Feb. 10, 1953

2,628,252

UNITED STATES PATENT OFFICE 2,628,252

PREPARATION OF MONOMERIC OPEN-CHAIN DELTA, EPSILON-UNSATU-RATED CARBONYL COMPOUNDS

Charles J. Albisetti, Jr., Wilmington, Del., assignor to E. I. du Pont de Nemours & Company, Wilmington, Del., a corporation of Delaware No Drawing. Application December 7, 1950, Serial No. 199,723

13 Claims. (Cl. 260—486)

This invention relates to unsaturated organic compounds, and more particularly to an improved process for the thermal addition of olefins to alpha,beta-unsaturated carbonyl compounds.

Olefins have been reacted with alpha,beta-unsaturated carbonyl compounds under various conditions. One of the known methods of doing this produces a mixture of products ranging from monomeric materials, such as the adduct of one molecule of one reactant with one molecule of the other reactant, to polymeric materials formed by polymerization of one or more of the unsaturated reactants, together with various byproducts. These methods have resulted in the addition of the olefin to the alpha-carbon of the alpha,beta-unsaturated carbonyl compound. With some specific unsaturated compounds, this method produces such a variety of products that it is not economically attractive for the manufacture of specific products desired for certain uses.

Other methods disclosed in the prior art for the condensation of alpha,beta-unsaturated aldehydes and ketones with other olefinically unsaturated compounds such as olefins, vinyl esters and esters of acrylic acids have produced only dihydropyran derivatives. In such reactions the yield of the dihydropyran derivative has amounted to as much as 85%. The long reaction times required in these methods are undesirable for commercial processes. Furthermore, in the case of easily polymerized unsaturated reactants, the long reaction times favor the formation of polymeric products over monomeric products to such an extent that extremely low yields of monomeric materials are obtained.

It is an object of this invention to provide an improved and novel process for the addition of mono-olefins to alpha,beta-unsaturated carbonyl compounds. A further object is to provide a novel process for obtaining improved yields of a monomeric open-chain delta,epsilon-unsaturated carbonyl compound from the reaction of a mono-olefin and an alpha,beta-unsaturated carbonyl compound. A still further object is to provide an improved process for obtaining in very short periods of reaction time good yields of the desired monomeric open-chain delta, epsilon-unsaturated carbonyl compound from the thermal reaction of an olefin and an alpha, beta-unsaturated carbonyl compound. Other objects will appear hereinafter.

The objects of this invention are accomplished by the following invention of a process for the addition of one mole of a mono-olefin having at least three carbon atoms to one mole of an alpha,beta-unsaturated carbonyl compound through the beta carbon atom thereof to form a monomeric open-chain delta, epsilon-unsaturated carbonyl compound which comprises heating at a temperature of 300° to 350° C. for a period of time not more than 15 minutes a reaction mixture free from a catalyst and containing the alpha,beta-unsaturated carbonyl compound and at least two molar equivalents of the mono-olefin. It has now been found that improved yields of monomeric open-chain delta, epsilon-unsaturated compounds, such as acids, esters, amides, aldehydes and ketones are provided by heating an alpha,beta-unsaturated carbonyl compound with at least two molar equivalents of an olefin having at least three carbon atoms at a temperature of 300° to 350° C. for a period of time not more than 15 minutes and in the absence of a catalyst. The process of this invention is preferably carried out in the presence of a liquid reaction medium, such as water or an organic solvent. In some cases the presence of water improves the yield of monomeric products and in others it retards the polymerization of the alpha,beta-unsaturated carbonyl compound. Because of the high reaction temperatures required, the process of this invention is carried out under superatmospheric pressure. In batch operation the process is simply carried out in a closed reaction vessel under the autogeneous pressure developed by the reactants at the operating temperatures. In continuous operation pressures of 25 to 3000 atmospheres are suitable. The particular pressure employed in any particular case depends on the particular olefin being used, a sufficient pressure being employed to maintain a high concentration of the lowest boiling reactant.

The process of this invention, involving the addition of one mole of an olefin having at least 3 carbon atoms to one mole of an alpha,beta-unsaturated carbonyl compound through the beta carbon atom thereof, is illustrated by the following equation for the addition of isobutylene to methyl vinyl ketone.

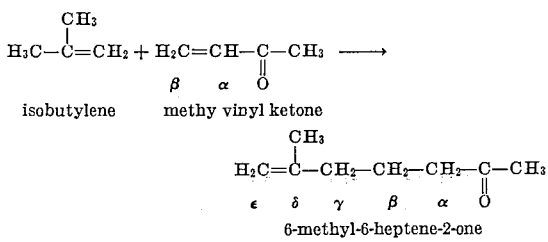

6-methyl-6-heptene-2-one

Thus it is seen that this reaction involves the addition of the olefin to the beta carbon of the alpha,beta-unsaturated carbonyl compound with a subsequent shift of the double bond of the olefin. A more precise understanding of this reaction may be afforded by the following mechanism, which is believed to represent the course of the addition of isobutylene to methyl vinyl ketone.

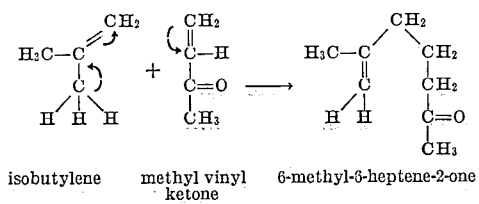

The two compounds are represented as approaching in such a way as to approximate a six-membered ring. The arrows indicate shifts of electron pairs, i. e., relocation of bonds between atoms.

A suitable method for carrying out the process of this invention comprises heating a mixture of a mono-olefin having three or more carbon atoms and an alpha,beta-unsaturated carbonyl compound in which there are from 2 to 4 moles of the olefin to one mole of the carbonyl compound, in a closed reaction vessel capable of withstanding superatmospheric pressure to a temperature between 300° and 350° C., for a period of time ranging from 1 to 15 minutes in the absence of a catalyst, and preferably in the presence of water, under the autogeneous pressure developed by the reaction mixture. A polymerization inhibitor, e. g., hydroquinone, can be included in the reaction mixture to prevent polymerization of polymerizable components. However, a polymerization inhibitor is not essential as the desired reaction proceeds in the absence of such a material. The reaction can also be carried out in the presence of an organic solvent, e. g., methanol or benzene. The resultant delta, epsilon-unsaturated acids, esters, amides, aldehydes, and ketones are isolated from the reaction mixture by conventional methods, e. g., by fractional distillation.

The process of this invention can also be carried out in a continuous manner. In this embodiment, which is very desirable for large scale operation, the mixture of olefin and alpha, beta-unsaturated carbonyl compound is passed through a reaction tube at superatmospheric pressure, e. g., at a pressure of from 25 to 3000 atmospheres, and if desired in the presence of an inert solvent, e. g., benzene, heated to a temperature between 300° and 350° C. In this method reaction times of from 1 to 5 minutes are suitable.

The invention is further illustrated by the following examples in which the proportions of the reacts are expressed in parts by weight unless otherwise specified.

*Example I*

A mixture of 200 parts of isobutylene, 15 parts of water, and 85 parts of methyl vinyl ketone is rapidly heated to 300° C. in a reaction vessel capable of withstanding high pressure, held at 300° C. for 15 minutes, and then rapidly cooled. The maximum pressure obtained is 945 atmospheres and there is a drop in pressure of 55 atmospheres. The crude reaction mixture amounts to 142 parts. After separation of 7 parts of water, there are obtained by fractional distillation 14 parts of an azeotrope of methyl vinyl ketone and water, 6 parts of material boiling up to 170° C., and 42 parts of 6-methyl-6-heptene-2-one, boiling at 170–174° C., and having a refractive index, $n_D^{25}$, of 1.4401. The residue amounts to 23 parts.

When isobutylene is reacted with methyl vinyl ketone at lower temperatures and longer periods of time than described in the above example, appreciable amounts of dihydropyran derivatives are obtained, with correspondingly smaller yields of the desired 6-methyl-6-heptene-2-one. For instance treatment of 70 parts of methyl vinyl ketone and 200 parts of isobutylene for 5 hours at 245° C., under 740 atmospheres pressure yields 4 parts of low boiling material, 17.5 parts of 2,2,6-trimethyl-3,4-dihydropyran, boiling at 130–131.25° C., $n_D^{25}=1.4390$; 3 parts of an intermediate fraction; 17 parts of 6-methyl-6-heptene-2-one, boiling at 169–170° C.; and 81 parts of residual material. At lower temperatures, e. g., 200° C., the ratio of pyran derivative to ketone is even higher.

*Example II*

A mixture of 42 parts of acrolein, 150 parts of isobutylene, and 79 parts of absolute methanol is heated rapidly to 250° C. in a reaction vessel capable of withstanding high pressure, held at 250° C. for 15 minutes, and then rapidly cooled. The crude reaction mixture is fractionally distilled and there are obtained 20 parts of 2,2-dimethyl-3,4-dihydropyran, boiling at 112–114° C.; 1 part of an intermediate fraction; 14 parts of 5-methyl-5-hexenal, boiling at 70–72° C. at 50 mm. pressure; and 20 parts of high boiling materials. The 5-methyl-5-hexenal has a refractive index, $n_D^{25}$, of 1.4343, and forms a semicarbazone derivative melting at 92–93° C. and a 2,4-dinitrohydrazone melting at 97–98° C.

When isobutylene and acrolein are heated together in the presence of methanol at lower temreratures than used in Example II, the major products are 2,2 - dimethyl - 3,4 - dihydropyran, formed by the addition of isobutylene to acrolein and acrolein dimer. For instance when 75 parts of acrolein and 225 parts of isobutylene are heated for 8 hours at 170° C. there are obtained by distillation of the reaction mixture 10 parts of acrolein, 40 parts of 2,2-dimethyl-3,4-dihydropyran, 23 parts of a mixture of acrolein dimer and 5-methyl-5-hexenal, boiling at 143–148° C., and 21 parts of higher boiling residues. The mixture of acrolein dimer and 5-methyl-5-hexenal has a refractive index, $n_D^{25}$, of 1.4500 and contains 64% acrolein dimer on the basis of carbon and hydrogen analysis. Similarly, when 100 parts of acrolein and 150 parts of isobutylene are heated for 4 hours at 200° C. there are obtained 25 parts of the dimethyldihydropyran, 40 parts of a mixture of acrolein dimer and 5-methyl-5-hexenal having a refractive index, $n_D^{25}$, of 1.4510, and 33 parts of higher boiling residues.

Example III

A mixture of 65 parts of methyl acrylate and 200 parts of isobutylene is heated rapidly to 300° C. in a reaction vessel capable of withstanding high pressure, held at 300° C. for 15 minutes and then rapidly cooled. The reaction mixture is fractionally distilled and there are obtained 6.5 parts of recovered methyl acrylate, 50 parts of methyl 5-methyl-5-hexenoate boiling at 160–170° C., and 53 parts of higher boiling residues.

Example IV

A mixture of 100 parts of 60% aqueous acrylic acid and 200 parts of isobutylene is heated as in the preceding examples at 300° C. for 15 minutes. On fractional distillation of the crude reaction mixture there are obtained 9 parts of recovered acrylic acid, 45 parts of 5-methyl-5-hexenoic acid boiling at 138–144° C. at 50 mm., and 17 parts of higher boiling material.

Example V

A mixture of 70 parts of ethyl crotonate, 160 parts of isobutylene and 1 part of hydroquinone is heated as in the preceding examples at 320° C. for 15 minutes. On fractional distillation of the crude reaction mixture there are obtained 33 parts of recovered ethyl crotonate, 10 parts of a liquid boiling at 95–105° C. at 50 mm., and 35 parts of higher boiling materials. Redistillation of the middle fraction yields 6.5 parts of ethyl 3,5-dimethyl-5-hexenoate boiling at 87° C./35 mm., and having a refractive index, $n_D^{25}$, of 1.4298, and a saponification number of 166.4 (calculated 170).

When isobutylene is reacted with ethyl crotonate at lower temperature and longer periods of time than those described in the preceding example, the desired ethyl 3,5-dimethyl-5-hexenoate is not formed in appreciable yields. For example, treatment of 56 parts of ethyl crotonate with 42 parts of isobutylene in the presence of 50 parts of benzene and 0.5 part of hydroquinone at 260° C. for 8 hours yields 110 parts of crude reaction mixture which on distillation gives 50 parts of recovered benzene, 40 parts of recovered ethyl crotonate, and 10 parts of material boiling up to 105° C. No ethyl 3,5-dimethyl-5-hexenoate is isolated.

Example VI

A mixture of 175 parts of diisobutylene (consisting of approximately 80% of 2,4,4-trimethyl-1-pentene and 20% of 2,4,4-trimethyl-2-pentene) and 50 parts of methyl vinyl ketone azeotrope (containing 15% water) is heated rapidly to 300° C. in a reaction vessel capable of withstanding high pressure, held at 300° C. for fifteen minutes, and then rapidly cooled. The crude reaction mixture, 305 parts, consists of 15 parts of a water/methyl vinyl ketone layer and 190 parts of an organic layer. Distillation of the organic layer yields 136 parts of reactants boiling up to 30° C./30 mm.; 5.3 parts boiling up to 106° C./14 mm.; 16.2 parts of product, principally 6-methylene-8,8-dimethylnonane-2-one, admixed with a minor amount of 5-t-butyl-6-methyl-6-heptene-2-one, having a boiling point of 106–108° C./14 mm. and a refractive index, $n_D^{25}$, of 1.4443; and 26 parts of residual material.

At lower reaction temperatures appreciable amounts of the corresponding cyclic methyl hexyl dihydropyran is obtained.

The process of this invention has been illustrated by particular reference to the reaction of olefins with certain alpha,beta-unsaturated carbonyl compounds. However, other alpha,beta-unsaturated carbonyl compounds, i. e., compounds having the >C=C—C=O group, are operable. Ketaldones are especially suitable in the process of this invention. The term "ketaldone" is used as a generic designation for aldehydes and ketones.

Still other specific alpha,beta-unsaturated carbonyl compounds which are operable in this invention include methacrylic acid, n-butyl methacrylate, methacrylamide, methacrolein, and benzyl crotonate. Alpha,beta-unsaturated carbonyl compounds having from 3 to 12 carbon atoms are preferred for use in the process of this invention.

Likewise in addition to the isobutylene and diisobutylene of the examples, other mono-olefins having at least three carbon atoms can be reacted with alpha,beta-unsaturated carbonyl compounds. Additional specific examples of mono-olefins which can be used include propylene, triisobutylene, beta-piene, tetramethylethylene, 2-butene, 1-pentene, and the like. The preferred olefins are those containing from 3 to 8 carbon atoms, and which are tertiary olefins, i. e., olefins in which one of the doubly bonded carbons is joined by single bonds to two other carbon atoms.

As indicated previously, the process of this invention can be carried out in the presence or absence of inert solvents or diluents. Suitable organic solvents include hydrocarbons, e. g., benzene, toluene, and cyclohexane; ethers, e. g., dioxane and dibutyl ether; and esters, e. g., ethyl and butyl acetate. Water is a preferred reaction medium, especially in the reaction of olefins with ketones and acids, where it improves the yields of the desired open chain unsaturated ketones and acids. However, because of the tendency of water to hydrolyze esters, it is naturally preferred, when esters are employed as the alpha,beta-unsaturated carbonyl reactant and water is present, to use short reaction times, e. g., as in a continuous process, to minimize the hydrolysis reaction.

The products obtained by the process of this invention are particularly useful as chemical intermediates and as perfume intermediates. The unsaturated acids and esters can be hydrogenated to the corresponding saturated acids or esters. The esters can be hydrolyzed to the corresponding acids. Also, the unsaturated aldehydes can be converted to useful amines.

As many apparently widely different embodiments of this invention may be made without departing from the spirit and scope thereof, it is to be understood that this invention is not limited to the specific embodiments thereof except as defined in the appended claims.

I claim:

1. A process for the addition of one mole of a mono-olefin having from 3 to 8 carbon atoms to one mole of an alpha,beta-unsaturated carbonyl compound consisting solely of hydrocarbon other than the group containing the carbonyl function and having from 3 to 12 carbon atoms through the beta carbon atom thereof to form a monomeric open-chain delta, epsilon-unsaturated carbonyl compound which comprises heating at a temperature of 300° to 350° C. for a period of time not more than 15 minutes a reaction mixture free from a catalyst and containing said alpha,beta-unsaturated carbonyl compound and at least two molar equivalents of said mono-olefin, then separating from said reaction mixture a monomeric open-chain delta,epsilon-unsaturated carbonyl compound as the resulting product.

2. A process for the addition of one mole of a mono-olefin having from 3 to 8 carbon atoms to one mole of an alpha,beta-unsaturated carbonyl compound consisting solely of hydrocarbon other than the group containing the carbonyl function and having from 3 to 12 carbon atoms through the beta carbon atom thereof to form a monomeric open-chain delta,epsilon-unsaturated carbonyl compound which comprises heating at a temperature of 300° to 350° C. for a period of time not more than 15 minutes a reaction mixture free from a catalyst and containing said alpha,beta-unsaturated carbonyl compound and at least two molar equivalents of said mono-olefin in an organic solvent, then separating from said reaction mixture a monomeric open-chain delta,epsilon-unsaturated carbonyl compound as the resulting product.

3. A process for the addition of one mole of a mono-olefin having from 3 to 8 carbon atoms to one mole of an alpha,beta-unsaturated carbonyl compound consisting solely of hydrocarbon other than the group containing the carbonyl function and having from 3 to 12 carbon atoms through the beta carbon atom thereof to form a monomeric open-chain delta,epsilon-unsaturated carbonyl compound which comprises heating at a temperature of 300° to 350° C. for a period of time not more than 15 minutes a reaction mixture free from a catalyst and containing said alpha,beta-unsaturated carbonyl compound and at least two molar equivalents of said mono-olefin in the presence of water, then separating from said reaction mixture a monomeric open-chain delta,epsilon-unsaturated carbonyl compound as the resulting product.

4. A process for the addition of one mole of a mono-olefin having from 3 to 8 carbon atoms to one mole of an alpha,beta-unsaturated ketone consisting solely of hydrocarbon other than the carbonyl group and having from 3 to 12 carbon atoms through the beta carbon atom thereof to form a monomeric open-chain delta,epsilon-unsaturated ketone which comprises heating at a temperature of 300° to 350° C. for a period of time not more than 15 minutes a reaction mixture free from a catalyst and containing said alpha,beta-unsaturated ketone and at least two molar equivalents of said mono-olefin, then separating from said reaction mixture a monomeric open-chain delta,epsilon-unsaturated ketone as the resulting product.

5. A process for the addition of one mole of a mono-olefin having from 3 to 8 carbon atoms to one mole of an alpha,beta-unsaturated aldehyde consisting solely of hydrocarbon other than the carbonyl group and having from 3 to 12 carbon atoms through the beta carbon atom thereof to form a monomeric open-chain delta,epsilon-unsaturated aldehyde which comprises heating at a temperature of 300° to 350° C. for a period of time not more than 15 minutes a reaction mixture free from a catalyst and containing said alpha,beta-unsaturated aldehyde and at least two molar equivalents of said mono-olefin, then separating from said reaction mixture a monomeric open-chain delta,epsilon-unsaturated aldehyde as the resulting product.

6. A process for the addition of one mole of a mono-olefin having from 3 to 8 carbon atoms to one mole of an alpha,beta-unsaturated ester consisting solely of hydrocarbon other than the carbonyloxy group and having from 3 to 12 carbon atoms through the beta carbon atom thereof to form a monomeric open-chain delta,epsilon-unsaturated ester which comprises heating at a temperature of 300° to 350° C. for a period of time not more than 15 minutes a reaction mixture free from a catalyst and containing said alpha,beta-unsaturated ester and at least two molar equivalents of said mono-olefin, then separating from said reaction mixture a monomeric open-chain delta,epsilon-unsaturated ester as the resulting product.

7. A process for the addition of one mole of a mono-olefin having from 3 to 8 carbon atoms to one mole of an alpha,beta-unsaturated carboxylic acid consisting solely of hydrocarbon other than the carboxyl group and having from 3 to 12 carbon atoms through the beta carbon atom thereof to form a monomeric open-chain delta,epsilon-unsaturated acid which comprises heating at a temperature of 300° to 350° C. for a period of time not more than 15 minutes a reaction mixture free from a catalyst and containing said alpha,beta-unsaturated carboxylic acid and at least two molar equivalents of said mono-olefin, then separating from said reaction mixture a monomeric open-chain, delta,epsilon-unsaturated acid as the resulting product.

8. A process for the addition of one mole of isobutylene to one mole of methyl vinyl ketone to form 6-methyl-6-heptene-2-one which comprises heating at a temperature of 300° to 350° C. for a period of time not more than 15 minutes a reaction mixture free from a catalyst and containing methyl vinyl ketone and at least two molar equivalents of isobutylene, then separating from said reaction mixture 6-methyl-6-heptene-2-one as the resulting product.

9. A process for the addition of one mole of isobutylene to one mole of acrolein to form 5-methyl-5-hexenal which comprises heating at a temperature of 300° to 350° C. for a period of time not more than 15 minutes a reaction mixture free from a catalyst and containing acrolein and at least two molar equivalents of isobutylene, then separating from said reaction mixture 5-methyl-5-hexenal as the resulting product.

10. A process for the addition of one mole of isobutylene to one mole of methyl acrylate to form methyl 5-methyl-5-hexenoate which comprises heating at a temperature of 300° to 350° C. for a period of time not more than 15 minutes a reaction mixture free from a catalyst and containing methyl acrylate and at least two molar equivalents of isobutylene, then separating from said reaction mixture methyl 5-methyl-5-hexenoate as the resulting product.

11. A process for the addition of one mole of isobutylene to one mole of acrylic acid to form 5-methyl-5-hexenoic acid which comprises heating at a temperature of 300° to 350° C. for a period of time not more than 15 minutes a reaction mixture free from a catalyst and containing acrylic acid and at least two molar equivalents of isobutylene, then separating from said reaction mixture 5-methyl-5-hexenoic acid as the resulting product.

12. A process for the addition of one mole of diisobutylene to one mole of methyl vinyl ketone to form 6-methylene-8,8-dimethylnonane-2-one which comprises heating at a temperature of 300° to 350° C. for a period of time not more than 15 minutes a reaction mixture free from a catalyst and containing methyl vinyl ketone and at least two molar equivalents of diisobutylene, then separating from said reaction mixture 6-methylene-8,8-dimethylnonane-2-one as the resulting product.

13. A process as set forth in claim 1 in which said mono-olefin has one of the doubly bonded carbons joined by single bonds to two other carbon atoms.

CHARLES J. ALBISETTI, Jr.

REFERENCES CITED

The following references are of record in the file of this patent:

UNITED STATES PATENTS

| Number | Name | Date |
| --- | --- | --- |
| 2,055,456 | Eichwald | Sept. 22, 1936 |
| 2,297,039 | van Melsen | Sept. 29, 1942 |
| 2,387,366 | Toussaint | Oct. 23, 1945 |
| 2,496,358 | Ross et al. | Feb. 7, 1950 |
| 2,514,168 | Smith et al. | July 4, 1950 |
| 2,562,849 | Whetstone et al. | July 31, 1950 |

OTHER REFERENCES

Feiser "Organic Chemistry," page 32 (1944), Heath and Co., pub.